United States Patent [19]
Calvin

[11] 3,920,514
[45] Nov. 18, 1975

[54] EMERGENCY CORE COOLING SPRAY HEAD

[75] Inventor: John Norman Calvin, West Simsbury, Conn.

[73] Assignee: Combustion Engineering, Inc., Windsor, Conn.

[22] Filed: Oct. 18, 1973

[21] Appl. No.: 407,692

[52] U.S. Cl. .................. 176/38; 176/50; 176/86 L
[51] Int. Cl. .................................... G21C 15/18
[58] Field of Search .......... 176/38, 39, 72, 86 L, 87, 176/44, 50, 64

[56] References Cited
UNITED STATES PATENTS

| | | | |
|---|---|---|---|
| 3,115,450 | 12/1963 | Schanz | 176/38 X |
| 3,205,146 | 9/1965 | Hackney et al. | 176/38 X |
| 3,290,222 | 12/1966 | Schoessow et al. | 176/38 X |
| 3,395,076 | 7/1968 | Ruppen, Jr. | 176/38 X |
| 3,475,272 | 10/1969 | Fortescue et al. | 176/38 X |
| 3,578,564 | 5/1971 | Fletcher | 176/38 |

Primary Examiner—Robert F. Stahl
Attorney, Agent, or Firm—Eldon H. Luther

[57] ABSTRACT

Apparatus is described for supplying emergency coolant fluid to the core region of a nuclear reactor in the event of a loss of coolant accident. A coolant plenum is integrally formed in each of the individual fuel assemblies that comprise the reactor core. The plenums are each connected to a pressurized source of emergency coolant fluid and means are provided to discharge the fluid from the plenums into the adjacent regions of the associated fuel assemblies.

6 Claims, 8 Drawing Figures

EMERGENCY CORE COOLING SPRAY HEAD

BACKGROUND OF THE INVENTION

This invention relates to nuclear reactors and more particularly to an emergency core coolant system for cooling the core of a nuclear reactor.

In the event of an accident in which there is a break in the reactor coolant system, it has been postulated that the entire coolant medium which absorbs and removes the heat generated in the nuclear core will be lost or at least considerably decreased. Although control elements are inserted into the core to terminate the fission process upon the occurrence of such an accident, decay heat generated by the already formed fission products is capable of causing fuel or clad melting if sufficient cooling is not supplied to the fuel. Furthermore, the overheating of the fuel cladding can result in a severe adverse chemical reaction with its environment which may not be reversed by later cooling procedures. Accordingly, it is necessary to provide a sufficient coolant flow immediately to insure that this heating of the fuel and cladding does not occur.

In some prior art systems, emergency core coolant water is normally injected into the inlet nozzles of the reactor and allowed to flow downwardly along the normal coolant path to the bottom of the vessel and then upwardly to the nuclear core. Obviously, with such a system, there is necessarily a time delay since the emergency coolant must first flood the bottom of the reactor before flowing upward into the core. Furthermore, the coolant injected into the reactor generates large quantities of steam which may create a pressure buildup in the core and outlet plenum of the reactor, thereby impeding further coolant from reaching the core.

In other prior art systems a special plenum for distributing emergency coolant fluid is provided in an inactive region of the reactor. This plenum is fluid coupled to an external source of fluid and means are provided for discharging the coolant supplied to the plenum into the affected regions of the reactor. These systems while avoiding some of the aforementioned problems are nonetheless somewhat deficient in that they do not positively insure that the coolant fluid will be injected into the entire affected region of the reactor core.

It is to an improved form of emergency core cooling apparatus, therefore, that the present invention is directed.

SUMMARY OF THE INVENTION

According to the present invention the above described disadvantages are avoided by providing in a nuclear reactor having a vessel containing a reactive core including a plurality of fuel elements therein and means for circulating coolant fluid through the reactive core during periods of normal reactor operation, means for supplying emergency coolant fluid to the reactive core in which the means includes a source of emergency coolant fluid; means defining a containment plenum integrally formed in each of the fuel elements; means connecting the plenums in fluid communication with the source; and means for discharging the emergency coolant fluid from each plenum to the region of the reactive core adjacent thereto.

It is a principal object of the present invention to provide means in a nuclear reactor effective to prevent overheating of the fuel elements therein during and after loss of coolant accident.

It is another object of the present invention to provide a nuclear reactor with means for more effectively dispersing emergency coolant fluid to the reactive core of the reactor in the event of a loss of coolant accident.

A further object of the invention is to provide means in a nuclear reactor capable of positively discharging emergency coolant fluid into all of the high temperature regions of the reactor core in the event of a loss of coolant accident.

These and further features and objects of the invention will be more readily apparent from the following detailed description of the preferred embodiments thereof.

DESCRIPTION OF THE PREFERRED EMBODIMENTS

Figure 1:
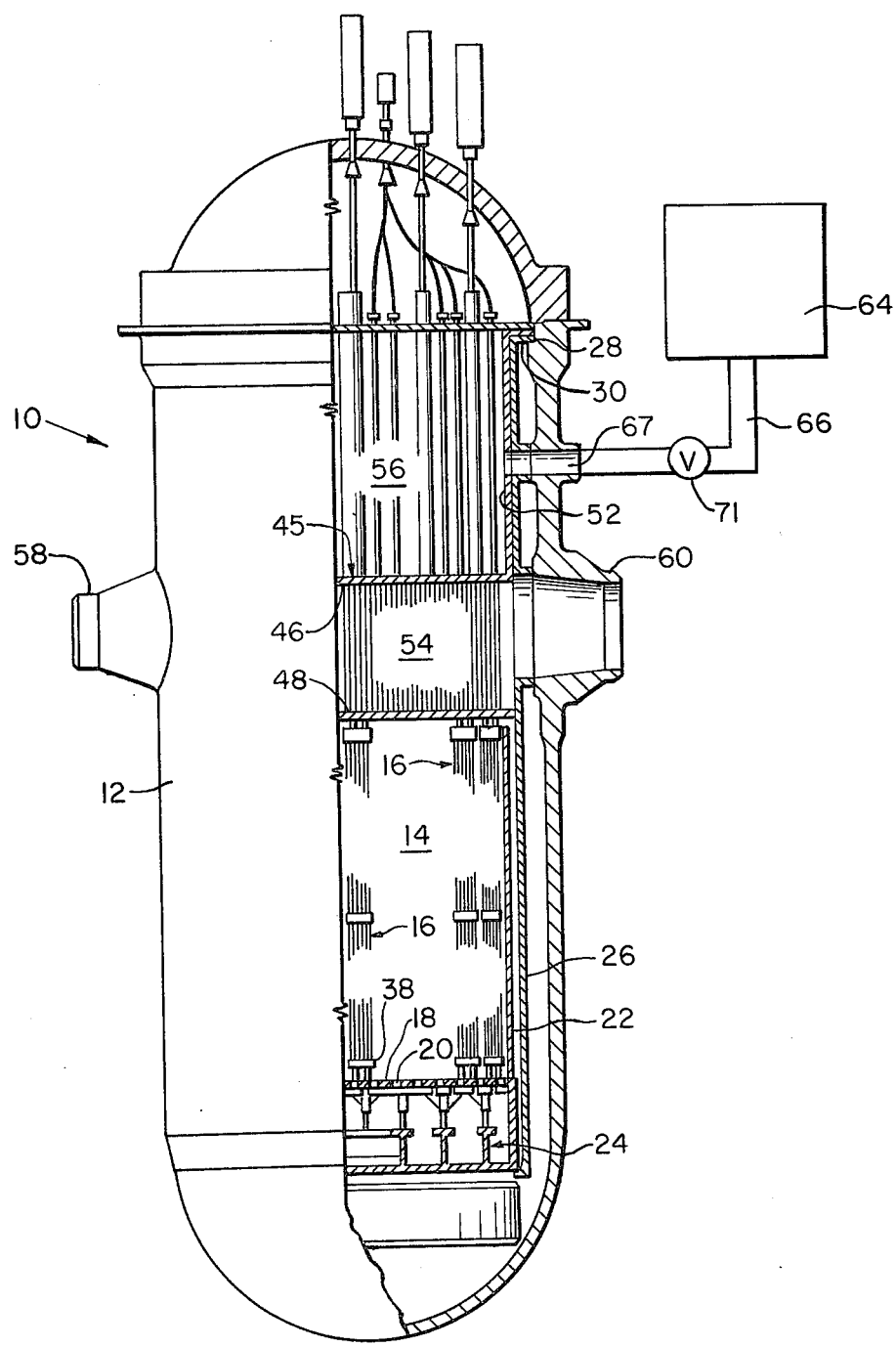
FIG. 1 is an elevational view partly in section of a nuclear reactor incorporating the present invention.

Referring now to FIG. 1, there is shown a nuclear reactor 10 including a reactor vessel 12 having an active core or fuel region 14 therein. The core 14 comprises a plurality of fuel assemblies 16 that are supported in position by a lower support plate 18 having apertures 20 therein for admitting fluid coolant to the core. A core support shroud 22 surrounds the core 14 and secures the lower support plate 18. The lower support plate 18 and the entire core assembly are vertically supported by a lower support assembly 24 which is, in turn, supported by the core support barrel 26, the latter being suspended from the vessel flange 28 by an out-turned lip 30 that engages the flange.

Figure 3:
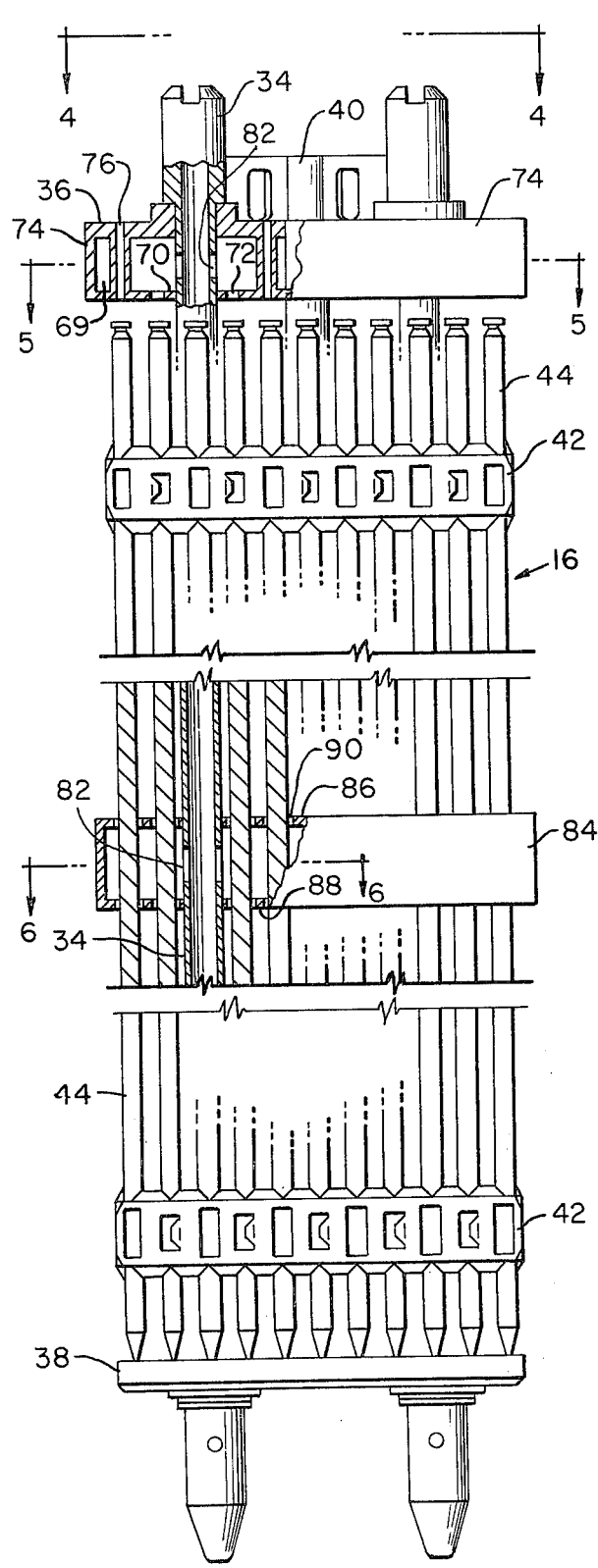
FIG. 3 is an enlarged elevational view partly in section of a typical fuel assembly according to the present invention.
Figure 4:
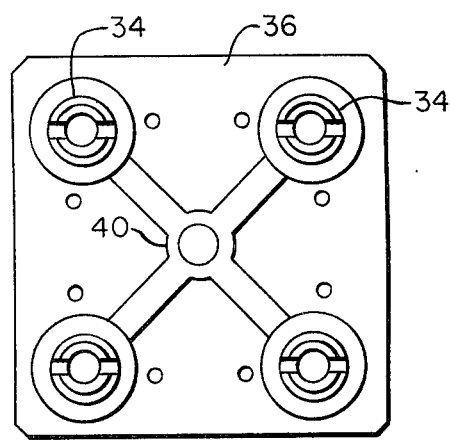
FIG. 4 is a plan view taken along line 4—4 of FIG. 3.
Figure 5:
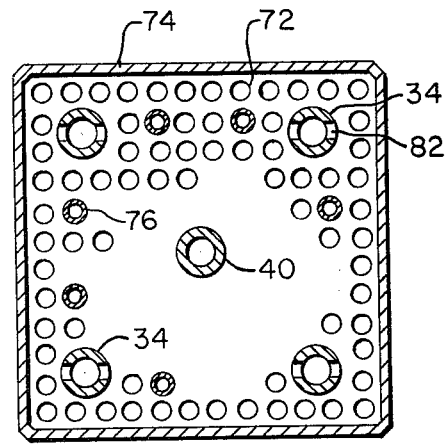
FIG. 5 is a sectional view taken along line 5—5 of FIG. 3.
Figure 6:
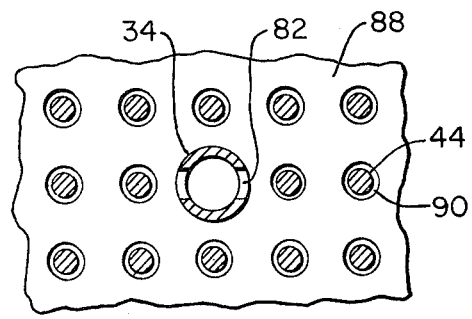
FIG. 6 is a sectional view taken along line 6—6 of FIG. 3.

In general the fuel assemblies 16 each include a plurality of longitudinally extending fuel elements and a plurality of hollow guide tubes interspersed between and within the array of fuel elements. In the arrangement shown in FIG. 3 the fuel assemblies 16 contain four vertically extending guide tubes 34 that are substantially coextensive and which are removably attached to upper and lower end fittings 36 and 38. A fifth guide tube 40 which is centrally located in the fuel assemblies is supported by the upper end fitting 36. The guide tubes 34 and 40 and the upper and lower end fittings 36 and 38 provide the structural framework for the fuel assembly.

A plurality of generally rectangularly arranged spacer grids 42 are suitably secured to the guide tubes 34 and 40 at spaced elevations therealong. The spacer grids 42 serve to support the plurality of parallel fuel elements 44 in vertical disposition. The grids 42 are of conventional design and include, as is well known, an array of mutually aligned, rectangularly arranged openings through which the fuel elements extend.

Figure 2:
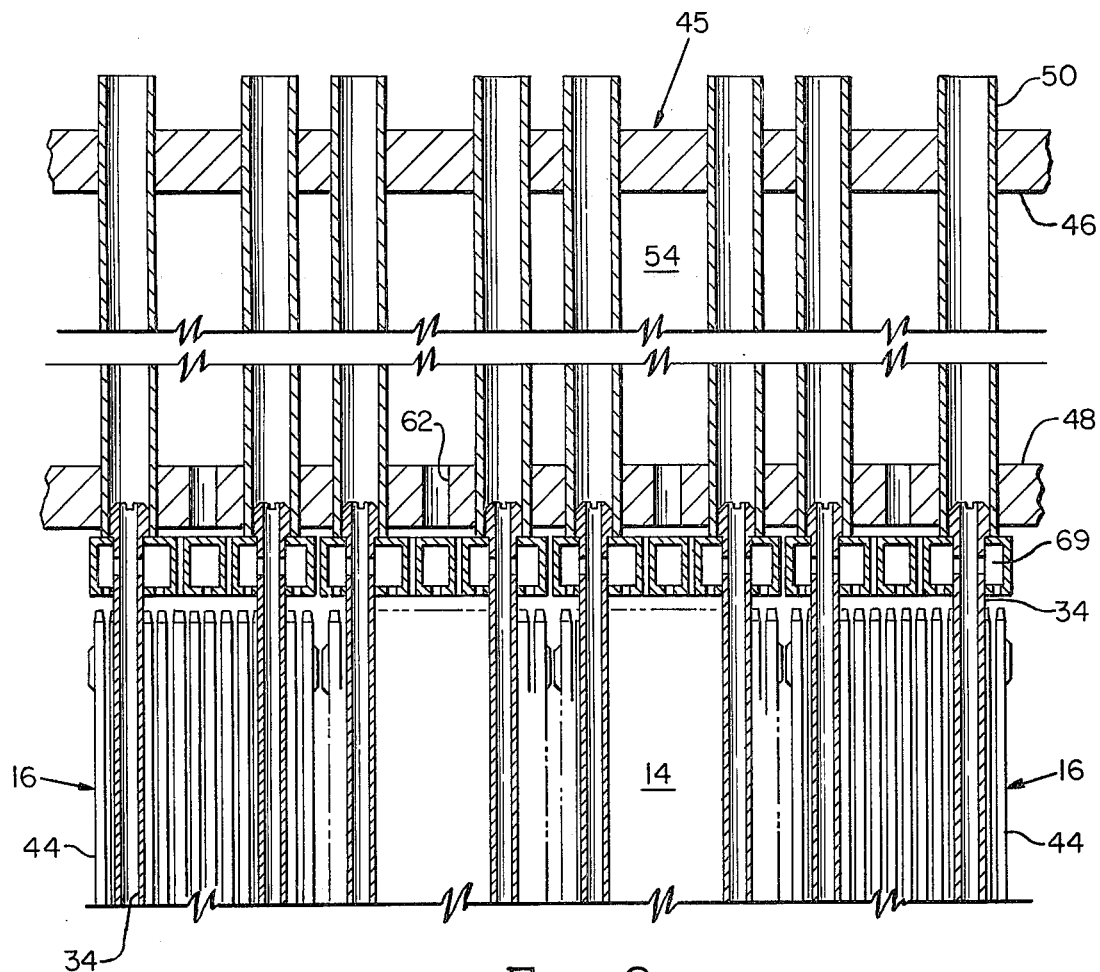
FIG. 2 is an enlarged elevational section of a portion of the nuclear reactor illustrated in FIG. 1.

Located above the core region 14 is a guide structure assembly 45 that serves to align the top ends of the fuel assemblies 16. The guide structure assembly 45 comprises a pair of vertically spaced tube sheets 46 and 48 which are rigidly interconnected by a plurality of longitudinally extending hollow tubes 50. The tubes 50 are secured to the tube sheets 46 and 48 as by means of welding and are disposed, as shown in FIG. 2, with their opposite ends located slightly above the upper tube sheet 46 and slightly below the lower tube sheet 48 respectively. A support barrel 52 (FIG. 1) is secured to the upper tube sheet 46 and suspends the guide structure assembly 45 within the core support barrel 26. Alignment of the respective fuel assemblies 16 is effected by the telescopic reception of the upper ends of the guide tubes 34 within the lower ends of the tubes 50.

The upper and lower tube sheets 46 and 48 of the guide structure assembly 45 divide the interior of the reactor vessel 12 into the core region 14, an outlet plenum 54 and an inactive plenum region 56. Liquid coolant nozzles 58 and 60 penetrate the wall of the reactor vessel 12 adjacent the outlet plenum 54. Nozzle 58 is the coolant inlet nozzle, which, during normal operating conditions, supplies operating liquid or primary coolant to the vessel. The primary coolant flows downwardly about the outside of the core region 14 before exiting the vessel interior from the outlet plenum 54 through the outlet nozzle 60. As the primary coolant flows through the core region 14 it extracts heat which is generated therein from the nuclear fission occurring within the fuel assemblies 16. The thus heated primary coolant enters the outlet plenum 54 through openings 62 provided in the lower tube sheet 48. From the outlet plenum 54 this fluid is passed through the outlet nozzle 60 and conducted to a vapor generator or the like (not shown) where it serves as the operating medium for heating vaporizable liquid supplied thereto.

Means are provided in the described reactor arrangement for supplying emergency core coolant to avoid the danger of overheating the component parts of the apparatus in the event of an occurrence of an emergency condition such as, for example, a loss of coolant accident wherein primary coolant is prevented from circulating through the reactor core. The emergency coolant liquid is contained in a storage tank 64 located externally of the reactor vessel 12. Means (not shown) are preferably provided to maintain the liquid under an elevated pressure within the tank 64. It is contemplated that a pressure of between 300 and 1200 psi will be suitable for this purpose. Flow line 66 connects the tank 64 in fluid communication with the inactive plenum 56 of the vessel 12 through aligned openings indicated generally as 67, provided in the vessel wall, the core barrel 26 and the upper guide structure support barrel 52 respectively. Valve 68 is provided in the line 66 and is activated in the event of an accident to supply the emergency coolant to the inactive plenum 56 from whence the liquid is dispersed as hereinafter described.

It will be appreciated that the emergency coolant liquid containment system is described herein for purpose of illustration only and that other and varied forms of coolant containment systems may be alternatively provided. For example, a plurality of tanks and associated conductors can be caused to communicate with the inactive plenum 56 at circumferentially spaced locations thereabout.

According to the present invention means are provided in the described arrangement for more effectively dispersing emergency core coolant liquid into the affected regions of the reactor. Accordingly, the fuel assemblies 16 that comprise the reactor core are each provided with integrally formed, substantially closed plenums which receive emergency core coolant liquid and from which the same is discharged into the adjacent regions of the core. In the form of the invention shown in FIG. 3 the plenum, indicated generally as 69, is defined by the upper end fitting 36 and a second transverse plate 70 that is coextensive with and spaced below the upper end fitting. The plate 70 is appropriately apertured to permit passage of the guide tubes 34 and 40. It further contains an additional group of openings 72 that operate to discharge the coolant downwardly onto the upper ends of the adjacent fuel elements 44. In the preferred form the number of openings 72 is equal to the number of fuel elements 44 in the associated fuel assemblies 16 and each is positioned directly over the top of one of the fuel elements to insure that each fuel element will obtain an adequate supply of coolant in the event of an accident.

The plenums 69 are closed about their periphery by rectangularly disposed side plates 74 that extend between and join the upper end fitting 36 and the plate 70. The openings in the upper end fitting 36 and plate 70 through which the respective guide tubes 34 and 40 pass are sealedly closed by welding or other appropriate seal means. There are also provided a number of short tubular conduits 76 that connect between aligned openings 78 and 80 in the upper end fitting 36 and plate 70 to accommodate the upward flow of primary coolant through the planes of the plenums during normal operation of the reactor.

The plenum 69 in each of the fuel assemblies 16 is fluid coupled to the inactive plenum region 56 of the vessel 12 through passages formed by the guide structure support tubes 50 and the guide tubes 34, the latter members containing one or more radial openings 82 to enable emergency coolant liquid to be directed into the respective plenums. Thus, in the event of an emergency condition requiring the admission of supplementary coolant liquid to compensate for the loss of primary coolant and to remove the decay heat from the reactor core the valve 68 in line 66 is actuated to an open position thereby placing the pressurized interior of tank 64 in fluid communication with all of the plenums 69. Emergency coolant liquid under pressure is thereby caused to flow into the inactive plenum region 56 of the reactor. From this region the liquid passes into the support tubes 50 and thence into the guide tubes 34 whose upper ends are open and each coupled with the lower ends of one of the support tubes 50. The liquid is directed into the several plenums 69 through the openings 82 provided in the guide tubes 34. From the plenums the liquid is discharged downwardly onto the underlying fuel elements 44 where it extracts decay heat from the reactive elements thereby to maintain the temperatures of the apparatus within tolerable limits.

By spray cooling the apparatus from plenums integrally formed in each fuel assembly the source of the emergency coolant is located closer to each of the fuel elements upon which the emergency coolant must operate. Thus better distribution of the coolant liquid is effected and an assurance is obtained that an adequate amount of coolant will be supplied to each fuel element in the apparatus. This advantage is further augmented by the fact that flow openings are now associated with each of the respective fuel elements thereby reducing the possibility of starving one or more from the application of emergency coolant.

A further advantage is derived from the fact that the emergency coolant discharged into the core is pressurized. Because the coolant is applied at an elevated pressure the possibility of steam blockage within the upper region of the reactor core is removed thereby insuring that coolant liquid will flow to all of the affected regions of the core. With coolant fluid being transferred into the reactor vessel at a pressure greater than that of the vapor generated therein in the event of an accident the latter will simply be forced from the reactor through any openings in the vessel such as the inlet or outlet nozzles.

In FIGS. 1, 3, and 6 through 8 there are shown other embodiments of the present invention that may be employed in conjunction with or separate from the above-described emergency coolant supply means. These forms of the invention involve plenums that may be located at one or more intermediate locations between the ends of the respective fuel assemblies 16. The plenums are indicated generally in the drawings as 84 or 84'. As shown, the plenums 84 and 84' each comprise a hollow rectangular chamber that is substantially co-extensive with the periphery of the respective fuel assemblies 16. Each is defined by a pair of longitudinally spaced, upper and lower transverse plates 86 and 88 respectively that each contain a plurality of aligned openings 90 permitting passage of the respective fuel elements 44. As shown the openings 90 are formed of a greater diameter than the fuel elements 44 in order to define concentric spaces through which coolant liquid can be discharged both upwardly and downwardly from the plenum interior. As in the previously described arrangement the plenums 84 and 84' are fluid coupled to the source of emergency coolant by means of the guide tubes 34 that extend the full length of the fuel assemblies 16 and which penetrate the transverse plates 86 and 88. As before, the coolant is discharged from the guide tubes 34 into the plenums through radial openings 82 provided in the former members.

Figure 7:
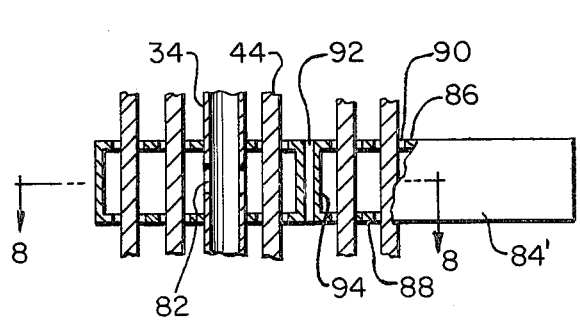
FIG. 7 is a partial elevational section taken along line 7—7 of FIG. 8 illustrating an alternative embodiment of the present invention.
Figure 8:
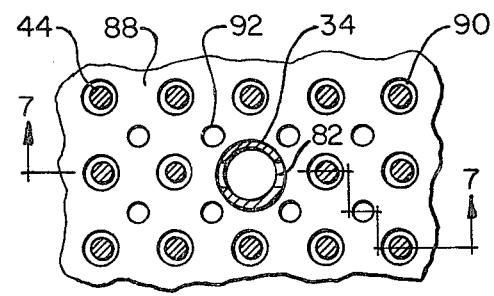
FIG. 8 is a sectional view taken along line 8—8 of FIG. 7.

In the plenums indicated as 84' and shown in FIGS. 7 and 8 the transverse plates 86 and 88 contain a separate group of aligned openings indicated as 92 which are connected by short tubular conductors 94 to form flow passages through the planes of the plenums.

It will be appreciated that when the form of plenum indicated as 84 is employed the upward flow of operating coolant fluid during normal operating conditions of the reactor will occur through the concentric spaces formed by the openings 90 in the plates 86 and 88 about the fuel elements 44. If a greater amount of flow area is required to conduct the primary coolant the form of plenum indicated as 84' and illustrated in FIGS. 7 and 8 can be employed. In this embodiment additional passages formed by the conductors 94 will provide supplemental flow area through which the upwardly flowing fluid can pass. The discharge of emergency coolant liquid in both embodiments however, is similarly effected through the spaces formed by the openings 90 about the fuel elements 44.

While these preferred embodiments of the invention have been shown and described, it will be understood that they are merely illustrative of the invention and not restrictive and that changes can be made without departing from the invention as claimed.

What is claimed is:

1. A nuclear reactor comprising:
   a. a substantially closed upstanding vessel,
   b. a pair of vertically spaced tube sheets dividing the interior of said vessel into axially spaced sections including a core region, an outlet plenum and an inactive plenum,
   c. a reactive core in said core region including a plurality of fuel assemblies each containing upper and lower end fittings, elongated hollow guide tubes attaching said end fittings in axially spaced relation and parallel fuel elements extending between said end fittings,
   d. means for circulating coolant fluid through said core during periods of normal reactor operation, and
   e. means for supplying emergency coolant fluid to said core in the event of a plant accident, said means including:
      i. a source of emergency coolant fluid disposed externally of said vessel,
      ii. duct means connecting said source with said inactive plenum,
      iii. a plurality of tubular connectors extending through said outlet plenum with their upper and lower ends attaching said tube sheets and communicating with said inactive plenum and said core region respectively,
      iv. plate means integral with each of said fuel assemblies forming enclosed plenums each having a transverse extent at least as great as that of the periphery of the associated fuel element bundle,
      v. said hollow guide tubes penetrating said plenums and having their upper ends communicating with said tubular connectors,
      vi. means forming openings in said guide tubes for connecting said plenums in fluid communication with tubular connectors, and
      vii. means forming openings in said plate means for the discharge of emergency coolant fluid from said plenums.

2. Apparatus as recited in claim 1 in which said plate means include a pair of axially spaced transverse plates and side plates connecting the peripheral edges of said transverse plates to close said plenums.

3. Apparatus as recited in claim 2 in which said transverse plates are disposed in overlying relationship to the upper ends of said fuel elements and the lowermost of said plates contains openings each disposed in substantial vertical alignment with the upper end of one of said fuel elements.

4. Apparatus as recited in claim 3 in which one of said transverse plates is said upper end fitting.

5. Apparatus as recited in claim 2 in which said transverse plates are disposed intermediate the ends of said fuel assemblies, said plates both containing aligned openings for the passage of fuel elements therethrough, the edges of said openings being concentrically spaced from the surface of said fuel rods.

6. Apparatus as recited in claim 5 including another group of aligned openings disposed in said transverse plates and means forming tubular connectors connecting aligned pairs of said openings for flow of coolant fluid past said plenum.

* * * * *